(No Model.)
C. MESSICK.
COMBINED STEAM COOKER AND BAKER.
No. 513,405. Patented Jan. 23, 1894.
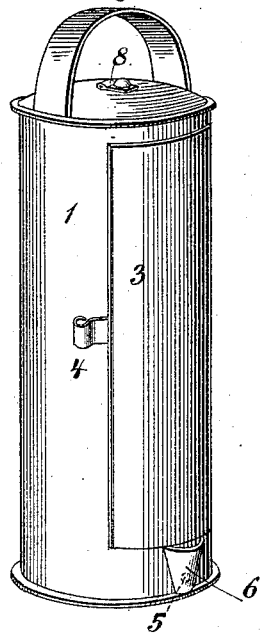
Fig. 1.
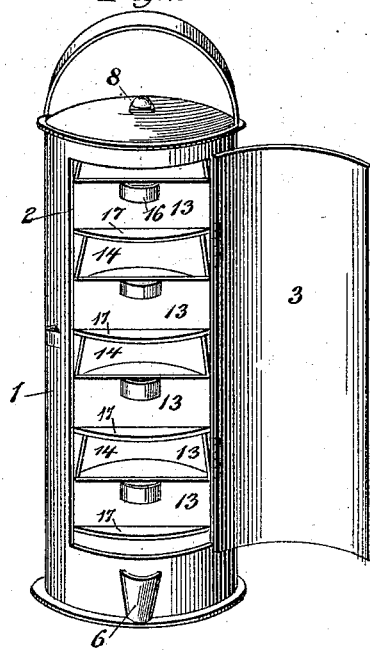
Fig. 2.
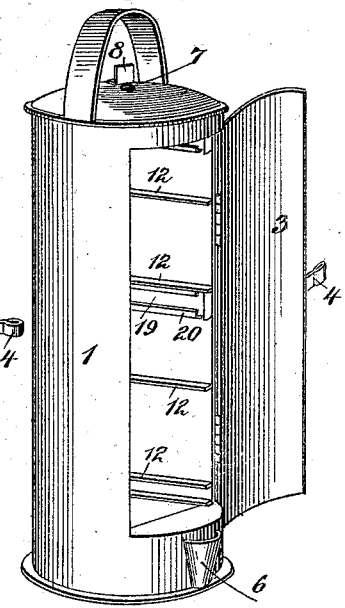
Fig. 3.
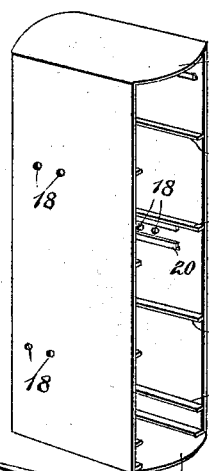
Fig. 4.
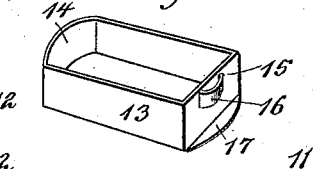
Fig. 5.
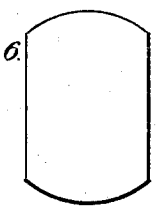
Fig. 6.
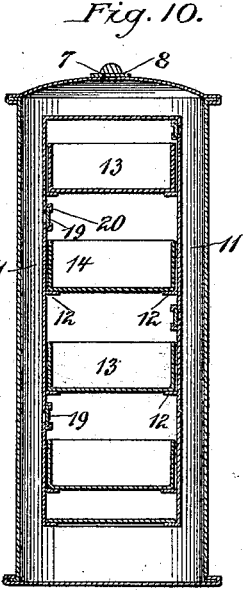
Fig. 10.
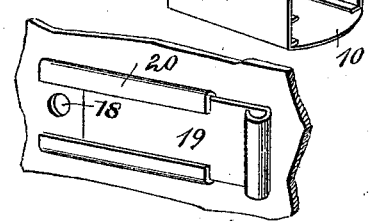
Fig. 7.
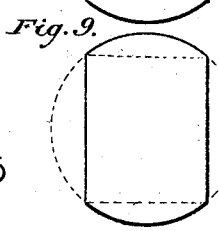
Fig. 8.
Fig. 9.
Witnesses
Geo Forker
H. O. C. Bussinso
Inventor:
Charles Messick
by Wm N Moore
Atty
THE NATIONAL LITHOGRAPHING COMPANY,
WASHINGTON, D. C.

UNITED STATES PATENT OFFICE.

CHARLES MESSICK, OF NICKERSON, KANSAS.

COMBINED STEAM COOKER AND BAKER.

SPECIFICATION forming part of Letters Patent No. 513,405, dated January 23, 1894.

Application filed March 23, 1893. Serial No. 467,397. (No model.)

*To all whom it may concern:*

Be it known that I, CHARLES MESSICK, a citizen of the United States, residing at Nickerson, in the county of Reno, State of Kansas, have invented certain new and useful Improvements in Steam Cookers and Bakers, of which the following is a specification.

My invention relates to improvements in combined steam cookers and bakers, of that type in which a series of compartments for various articles to be cooked is employed.

One object of my invention is the provision of a cooking utensil in which the cooking receptacles when in position prevent the odors arising therefrom entering the compartments containing the other receptacles and thus preventing commingling of the odors to the detriment of the food.

Another object of my invention is the provision of a cooking utensil which will permit ready and easy access to any of the receptacles desired without disturbing the others.

Another object of my invention is the provision of a cooking utensil of the simplest and cheapest possible construction to render the utensil efficient, practical and useful.

To attain the desired objects my invention consists of a steam cooker and baker embodying novel features of construction and combination of parts for service substantially as disclosed herein.

Figure 1 represents a perspective view of my utensil as it appears when in actual use or ready for use. Fig. 2 represents a perspective view with the door open and the cooking pans in place. Fig. 3 represents a perspective view with the door open and the pans removed to show the pan guides or cleats. Fig. 4 represents a perspective view of the inner casing. Fig. 5 represents a perspective view of one of the pans removed to show clearly its peculiar and novel construction. Figs. 6, 7, 8 and 9 represent detail views. Fig. 10 represents a vertical sectional view of the complete utensil.

Referring by numerals to the drawings in which similar numerals denote corresponding parts in all figures, the numeral 1 designates the cylindrical casing or housing, having opening 2, door 3 provided with catch 4, filling opening 5, concealed by spout 6, and escape opening 7 provided with valve 8. The opening extends vertically of the casing and nearly the entire length thereof and in the cylindrical casing is placed the rectangular or oblong case 9, the back of which is curved and also the top and bottom of which is provided with the curved extensions or lips 10 which fit snugly against the walls of the cylindrical casing and provide a flue 11 on each side of the oblong case. The case is provided on its inner walls with cleats 12, on which are supported the cooking receptacles 13, having the rear curved wall 14, the front straight wall 15, having handle 16, and the curved lips 17. By means of this construction it will be seen that the receptacles fit in the case and can be handled separately after the manner of drawers and the curved back and lips cause them to fit the casing very close or "steam tight" so as to cut off one receptacle entirely from the others and this is a feature of paramount importance.

The case is provided with openings 18 on each side and these openings admit steam or heat to each compartment and are controlled by slides 19, movable in guides 20 on the case. The openings are arranged as shown in order that steam or heat will be admitted to the compartments evenly from each flue.

In operation a proper amount of water is placed in the vessel or casing and the steam rising therefrom enters each compartment and properly cooks the contents of each pan and the pans serve to make steam tight compartments and prevent commingling of odors. When used to bake no water is placed in the casing but heat acts in the same manner as steam.

I claim—

1. A cooker and baker consisting of the cylindrical casing, the case therein, and the series of cooking pans arranged in the case and having the curved back and curved lips or extensions at the front fitting closely in the casing to form steam tight compartments.

2. A cooker and baker, consisting of the cylindrical casing having the filling opening, the access opening and door, the case in the cylindrical case having curved back and curved lips or extensions at the front, openings in the sides of the casing and valves or slides controlling the openings, cleats on the inner side of the case, and cooking pans resting on the cleats and having curved back and curved front lips or extensions, all as and for the purpose stated.

CHARLES MESSICK.

Witnesses:
ALBERT NORTH,
N. J. EBY.